(12) United States Patent
Shrock (10) Patent No.: US 12,410,865 B2
(45) Date of Patent: Sep. 9, 2025

(54) LUBRICATING SEAL FOR RECIPROCATING MEMBERS

(71) Applicant: Joel Aaron Shrock, Berkeley, CA (US)

(72) Inventor: Joel Aaron Shrock, Berkeley, CA (US)

( * ) Notice: Subject to any disclaimer, the term of this patent is extended or adjusted under 35 U.S.C. 154(b) by 926 days.

(21) Appl. No.: 17/519,928

(22) Filed: Nov. 5, 2021

(65) Prior Publication Data

US 2022/0144375 A1   May 12, 2022

Related U.S. Application Data

(60) Provisional application No. 63/110,645, filed on Nov. 6, 2020.

(51) Int. Cl.
*F16J 15/324*   (2016.01)
*B62K 25/06*   (2006.01)

(52) U.S. Cl.
CPC ............. *F16J 15/324* (2013.01); *B62K 25/06* (2013.01)

(58) Field of Classification Search
CPC . F16J 15/324; B62K 25/06; F16F 9/36; F16F 9/362; F16F 9/363
See application file for complete search history.

(56) References Cited

U.S. PATENT DOCUMENTS

| | | | | |
|---|---|---|---|---|
| 2,390,928 A | * | 12/1945 | Van Dyke | F16J 15/324 277/565 |
| 2,459,654 A | * | 1/1949 | Kellogg | F16J 15/324 277/436 |
| 2,827,344 A | * | 3/1958 | Maag | F16C 33/6618 384/484 |
| 3,413,008 A | * | 11/1968 | Greiner | F16J 15/3256 277/505 |
| 3,472,519 A | * | 10/1969 | Gehret | F16C 33/726 277/552 |
| 3,871,666 A | * | 3/1975 | Franz | F16J 15/324 277/563 |
| 4,413,829 A | * | 11/1983 | Pietsch | F16J 15/324 277/504 |
| 6,293,558 B1 | * | 9/2001 | Crapart | F16J 15/3252 277/572 |

(Continued)

*Primary Examiner* — Nicholas L Foster

(57) ABSTRACT

A seal for use between a first and second telescopically configured bicycle member, comprises a substantially cylindrical body having a first ring portion and a second ring portion. The first ring portion has a diameter that is different than a diameter of the second ring portion. The top ring portion is coupled to a first telescopic member and the bottom ring portion is coupled to a second telescopic member. The body has an opening defined therethrough from a top surface of the first ring portion to a bottom surface of the second ring portion. The opening receives the first telescopic member therethrough. An injector port is coupled to the body and has a first port opening and a second port opening. A port channel is in communication with the first and second port openings. The second port opening is in communication with a pocket configured to hold a fluid therein, the injector port configured to receive the lubricant in a first flow direction from the first port opening to the second port opening, wherein the pocket houses the lubricant therein to maintain communication between the lubricant and the first and second telescopic members.

12 Claims, 12 Drawing Sheets

Section B-B

Section B-B (56) References Cited

U.S. PATENT DOCUMENTS

| | | | | |
|---|---|---|---|---|
| 6,513,812 B1* | 2/2003 | Yang | ................. | F16J 15/3224 |
| | | | | 277/351 |
| 6,561,519 B1* | 5/2003 | Frese | ................. | F16J 15/3232 |
| | | | | 277/552 |
| 6,997,285 B2* | 2/2006 | Downes | ............... | F16J 15/3252 |
| | | | | 184/105.3 |
| 7,931,125 B2* | 4/2011 | Downes | ............... | F16J 15/3252 |
| | | | | 184/6.18 |
| 8,136,818 B2* | 3/2012 | Yamanaka | ............ | F16J 15/324 |
| | | | | 277/424 |
| 8,220,803 B2* | 7/2012 | Yamanaka | ............ | F16J 15/324 |
| | | | | 277/423 |
| 8,714,561 B2* | 5/2014 | Yamanaka | ............ | F16J 15/324 |
| | | | | 277/552 |
| 9,120,526 B2* | 9/2015 | Ogura | ..................... | F16F 9/00 |
| 10,550,890 B2* | 2/2020 | Fangauf | ................ | F16J 15/002 |
| 11,619,306 B2* | 4/2023 | Kogler | ............... | F16C 33/7856 |
| | | | | 277/549 |
| 2003/0019692 A1* | 1/2003 | Downes | ............... | F16J 15/3252 |
| | | | | 184/105.3 |
| 2004/0245728 A1* | 12/2004 | Armour | ................ | F16J 15/324 |
| | | | | 277/549 |
| 2006/0071430 A1* | 4/2006 | Downes | ............... | F16J 15/3252 |
| | | | | 277/549 |
| 2008/0258406 A1* | 10/2008 | Dahlheimer | ......... | F16J 15/3276 |
| | | | | 277/569 |
| 2011/0163507 A1* | 7/2011 | Downes | ............... | F16J 15/3252 |
| | | | | 277/500 |
| 2013/0001889 A1* | 1/2013 | Scaramozzino | ..... | F16J 15/3216 |
| | | | | 277/561 |
| 2014/0167380 A1* | 6/2014 | Ogura | ..................... | F16F 9/18 |
| | | | | 280/276 |
| 2019/0383395 A1* | 12/2019 | Bresso | ................ | F16J 15/3276 |
| 2021/0036575 A1* | 2/2021 | Pei | ........................ | H02K 5/173 |

* cited by examiner

Fig. 5  Section B-B

Fig. 6  Section B-B

Section B-B

Secton B-B    Fig. 14

Secton B-B

Fig. 15

Secton B-B

Secton B-B

Secton B-B    Fig. 21

LUBRICATING SEAL FOR RECIPROCATING MEMBERS

PRIORITY CLAIM

This application claims the benefit of U.S. Provisional Patent Application Ser. No. 63/110,645 filed Nov. 6, 2020, which is hereby incorporated by reference in its entirety.

TECHNICAL FIELD

The present disclosure relates to an improved lubricating seal for use with reciprocating or rotating shafts like those used on mountain bike and motorcycle suspension forks and adjustable seat posts for bikes. In an aspect, the present disclosure relates to a shaft seal which forms a reservoir pocket or pockets between the seal and the shaft when installed and a means of repeatedly injecting lubrication through the side of the seal so lubrication can be stored within the seal/shaft interface to reduce friction on the shaft as it moves, as a result of the lubrication being stored within the seal/shaft interface.

BACKGROUND

Seals for reciprocating and rotating shafts are used on suspension forks for mountain bikes and motorcycles to keep dirt and debris from entering the inner workings suspension fork where the shaft enters the fork lowers, while also containing the lubrication within fork lowers to keep them running smoothly.

These seals suffer from premature wear and unneeded friction from lack of lubrication.

Presently, many suspension forks require users to position their bike vertically or hang their bike from the front wheel on a hook, in order to get the lubricating oils to flow from the bottom of the fork lowers toward absorbent foam rings and the seals that reside at the top of the lowers. Many users don't take the time or have the space to hang their bikes like this to lubricate their seals. Other systems (US PAT #20060071430A1 Shaft seal with lubrication device) inject lubrication into absorbent rings that reside below the seals, but they also are susceptible to gravity pulling the lubrication downward away from the seals and they also run the risk of filling the lowers with lubrication after repeated usage, which would in-turn reduce the volume of the fork lowers and alter the spring curve of the suspension.

Presently, bike forks come in two configurations, inverted forks and upright forks. Inverted forks have the inner telescopic tube (Stanchion) protrude from the bottom of the larger diameter housing that is mounted to the bike. This provides constant lubrication because the lubricating oil falls to the bottom of the upper housing and constantly lubricates the seals as the lower stanchion moves up and down over bumps. Upright forks, among other applications, differ from inverted forks in that the smaller telescoping stanchions extend out of the top of the larger diameter lower housing (i.e. lower). As the wheel hits bumps and moves the fork lowers up and down with respect to the bike, the seal between the lower and the smaller diameter stanchion creates friction if not adequately lubricated. The friction created in upright forks is greater than inverted forks because gravity pulls the internal lubricating fluids to the bottom of the fork legs, away from the seals which reside at the top of the fork legs.

Figure 1:
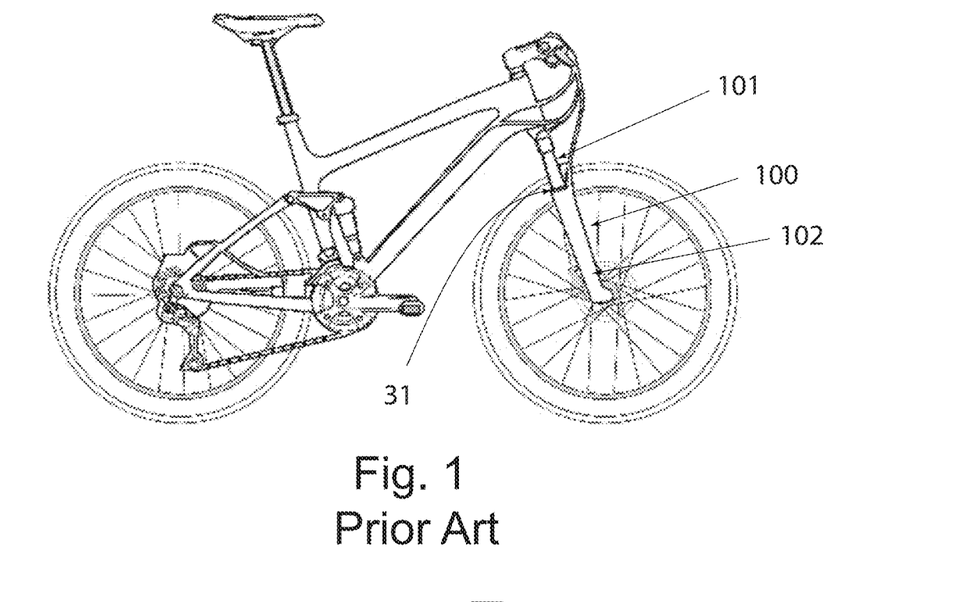
FIG. 1 Shows a prior art side view of a mountain bike with suspension forks.

FIG. 1 shows a side view of a mountain bike with an upright suspension fork installed on it 100. The sliding fork stanchions 101 and the fork lowers 102 are guided and sealed by the fork seals 31. Current seals 31 create excess friction when the stanchions move, which thereby causing a harsh ride and excess wear which results in premature wear of expensive components, and more frequent seal replacement. Typical seals 31 are lubricated from within the fork lowers 102. However, when the bike is stored upright, gravity pulls the lubrication toward the bottom of the fork lower and away from the seals 31, where it is needed. Some seals 31 use viscous lubricants like grease inside the seal/stanchion interface, but grease is not as slippery as a liquid lubrication so they too have unnecessary friction. Liquid lubrication is the best for high speed applications. However, presently there's no way to install a seal with liquid lubrication contained within it.

One method may be to apply higher viscosity lubricants like grease to the inside of the seals so that the grease won't fall out before installation. However, a liquid is preferred since it is less viscous and more slippery, which reduces friction further, especially in high-speed bumps. Grease is used, because there is presently no way to put a less viscous liquid into the seals effectively during, or after installation. If a liquid lubricant is applied to the seal before installation, it simply flows off before installation. Filling a traditional seal with liquid lubrication could also have unwanted side effects. If the oil migrates downwards, and the fork lowers get filled with lubrication, it may negatively affect the performance of the fork, because the air volume within the lowers is reduced which causes their spring rate to change. This needs to be avoided.

What is needed is a seal that allows a liquid lubricant to be repeatedly injected therein, wherein the seal maintains the liquid lubricant therein and allows the lubricant to be in constant contact with the stanchion to thereby reduce friction between the stanchion and the seal. What is also needed is a system in which the seal's typical duties of the upper wiper of the seal keeping dust, dirt, moisture from entering the seals or lowers from the outside environment through the top of the seal so the seal and lowers maintain a clean environment that is free of contaminants. What is further needed is a system in which the lower wiper of the seal prevents liquid or air from escaping the lowers so the lowers do not lose lubrication or air volume.

SUMMARY

In an aspect, a seal for use between a first and second telescopically configured bicycle member is disclosed. The seal comprises a substantially cylindrical body having a first ring portion and a second ring portion. The first ring portion has a diameter that is different than a diameter of the second ring portion, wherein the top ring portion is coupled to a first telescopic member and the bottom ring portion is coupled to a second telescopic member. The body has an opening defined therethrough from a top surface of the first ring portion to a bottom surface of the second ring portion. The opening is configured to receive the first telescopic member therethrough. The seal includes an injector port coupled to the body. The injector port has a first port opening and a second port opening and a port channel in communication with the first and second port openings. The second port opening is in communication with a pocket configured to hold a fluid therein. The injector port is configured to receive the lubricant in a first flow direction from the first port opening to the second port opening, wherein the pocket houses the lubricant therein to maintain communication between the lubricant and the first and second telescopic members.

In another aspect, a seal system comprises a seal. The seal comprises a substantially cylindrical body having a first ring portion and a second ring portion. The first ring portion has a diameter that is different than a diameter of the second ring portion, wherein the top ring portion is coupled to a first telescopic member and the bottom ring portion is coupled to a second telescopic member. The body has an opening defined therethrough from a top surface of the first ring portion to a bottom surface of the second ring portion. The opening is configured to receive the first telescopic member therethrough. The seal includes an injector port coupled to the body. The injector port has a first port opening and a second port opening and a port channel in communication with the first and second port openings. The second port opening is in communication with a pocket configured to hold a fluid therein. The injector port is configured to receive the lubricant in a first flow direction from the first port opening to the second port opening, wherein the pocket houses the lubricant therein to maintain communication between the lubricant and the first and second telescopic members. The seal system further comprises a removable filling mechanism that is configured to be at least partially inserted into the injector port. The filing mechanism is configured to deposit the lubricant in a direction toward the second port opening and the pocket.

In yet another aspect, a bicycle comprising: a first telescopic member; a second telescopic member in cooperation with the first telescopic member; and a seal coupled to the first and second telescopic members. The seal comprises a substantially cylindrical body having a first ring portion and a second ring portion. The first ring portion has a diameter that is different than a diameter of the second ring portion, wherein the top ring portion is coupled to a first telescopic member and the bottom ring portion is coupled to a second telescopic member. The body has an opening defined therethrough from a top surface of the first ring portion to a bottom surface of the second ring portion. The opening is configured to receive the first telescopic member therethrough. The seal includes an injector port coupled to the body. The injector port has a first port opening and a second port opening and a port channel in communication with the first and second port openings. The second port opening is in communication with a pocket configured to hold a fluid therein. The injector port is configured to receive the lubricant in a first flow direction from the first port opening to the second port opening, wherein the pocket houses the lubricant therein to maintain communication between the lubricant and the first and second telescopic members.

In any or all of the above aspects, the first telescopic member is a bike stanchion and the second telescopic member is a lower fork. The pocket further comprises an open reservoir in communication with the stanchion. The pocket further comprises an inner wall between the open reservoir and the stanchion. The inner wall further comprises one or more slits in communication with the pocket to form a slitted reservoir. The injector port is positioned parallel to the top surface in an aspect. The injector port is positioned perpendicular to the top surface in an aspect. In an aspect, the body further comprises one or more spring recesses configured to receive loaded springs. In an aspect, the body further comprises one or more wipers located in the top ring portion. In an aspect, the body further comprises one or more wipers located in the bottom ring portion. In an aspect, the injector port further comprises one or more moveable flaps which allow the lubricant to flow in the first direction and prevent the lubricant from flowing in an opposite direction out the first port opening. In an aspect, the moveable flap is in communication with the pocket, wherein the moveable flap is positioned to be facing a slit in another aspect.

BRIEF DESCRIPTION OF THE DRAWINGS

The present disclosure will be fully understood from the detailed description and the following drawings.

DETAILED DESCRIPTION

The seal system of the present disclosure has several advantages. The seal provides a clean and easy way to insert liquid lubrication into them after they have been installed. The seal continuously provides lubrication by holding lubrication within the seal/stanchion interface. Seals with fresh lubrication have a longer service life and protect the expensive stanchions from wear. Liquid lubrication helps the fork perform better by reducing friction, so fewer trail bumps are transmitted to the handlebars because the forks move more freely. Gravity will not pull the lubrication away from the seals, since the lubrication is stored within the seals. The seal resists leaking lubricating fluids back out of the injection port because of the anti-leak flaps inside the injection port. The seal resists downward fluid transfer into the fork legs because of the upward facing wipers at the bottom of the seal. The top, upward facing wiper prevents outside contaminants from entering the seals, or the lowers. The lower downward facing wiper(s) keeps the lubricating oils within the lowers from migrating upward. The seal is backward compatible, so they can be installed onto older or new forks without the need to change tooling. Injecting lubrication into the seal is quick and easy and will allow bike riders who are not confident in replacing their seals to be able to perform a seal maintenance in seconds by injecting fresh lubrication to improve the performance of their forks and extend the life of them. The seal saves the user time and money, because they require replacement less frequently, which is costly and far more complicated than the process to inject fluids into them. The seal purges debris from the top of the seal to clean them and help them last longer. When the seal is filled, excess fluid comes out the top of the seal, pushing out dirt that may have collected at the top of the seal. The dirt and excess lubrication are wiped away after, leaving a clean seal. Injecting fluids into the side port will not introduce contaminants into the seal, because the outside of the injection port is smooth and easily cleaned.

The seal of the present disclosure is designed to lubricate itself to reduce friction. In particular, the design provides a clean and easy way to fill and refill the seal/stanchion interface with lubrication. Grease, Oil or other low viscosity lubricants can be injected into the seal, although a liquid with lower viscosity like 5 weight suspension oil is preferred. Once the lubricant is injected into the seal, the lubrication is held within the seal and interfaces with the stanchion portion of the sliding member (stanchion) interface. This results in the seal interface being consistently lubricated and slippery. The following description of the embodiments is exemplary in nature and is not intended to limit the present seal, its application or its uses. It should be noted that although the seal is described and shown used on a bicycle, the seal can be used in other vehicles or non-vehicles where the seal allows one reciprocating member to telescopically move along a common axis with another reciprocating member.

Figure 2:
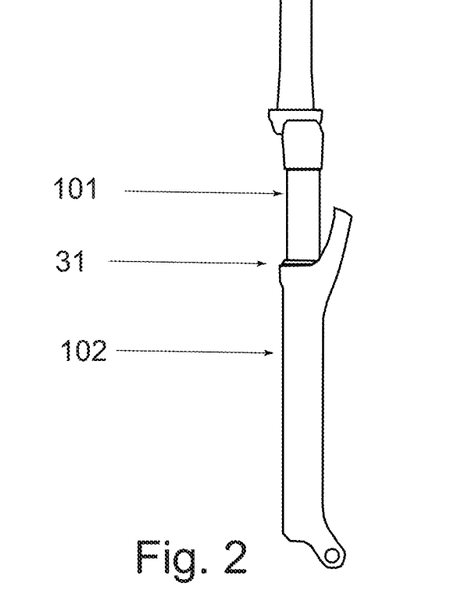
FIG. 2 Shows the features of a suspension mountain bike fork in accordance with an aspect of the present disclosure.

FIG. 2 shows an upright suspension fork system in accordance with an embodiment of the present disclosure. The sliding fork stanchion 101 and the fork lower 102 are guided and sealed by a fork seal 31, which are described herein. It should be noted that although the right side of the front wheel is shown, the seal 31 can be used on both sides of the bike and can be additionally/alternatively applied to the rear tire by implementing the seal on a rear shock, as they too have a shaft seal that functions the same way as the seals on forks. Adjustable seat posts use a similar type of seal, and this invention could be applied there as well.

Figure 3:
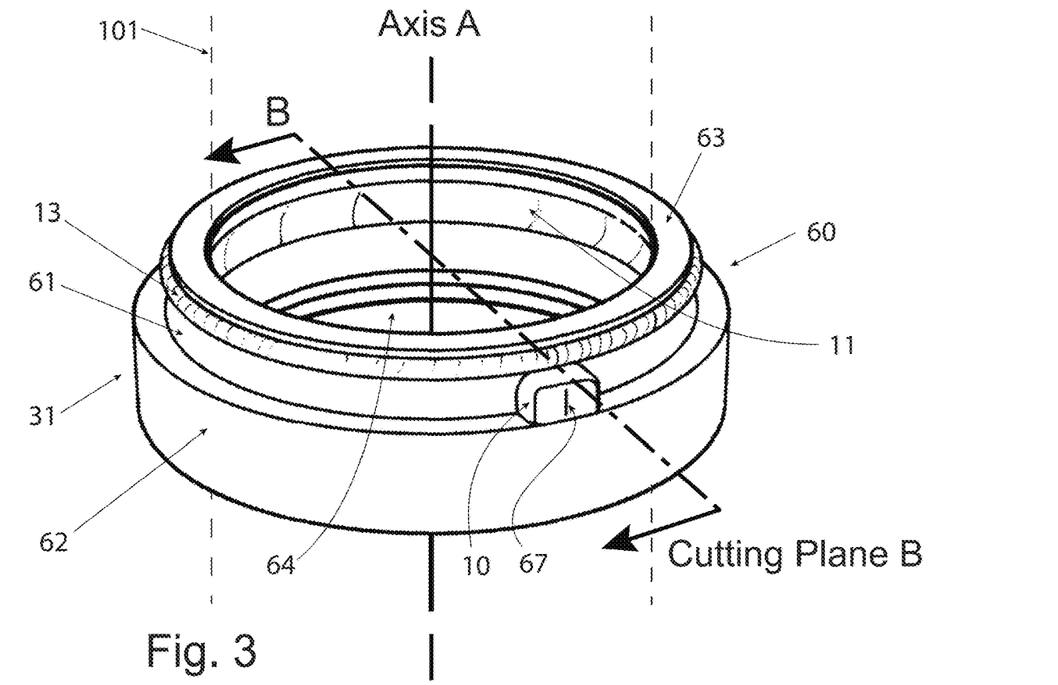
FIG. 3 Shows a perspective view of the seal that shows the injection port and lubricant reservoir in accordance with an aspect of the present disclosure.

FIG. 3 illustrates an embodiment of the lubricating seal for reciprocating or rotating members. It should be noted that the seal 31 in FIG. 3 is one embodiment and is not limited to the design shown. The seal 31 has a body 60 having top ring 61 and a bottom ring 62 which are vertically aligned along with and concentric to Axis A. In an embodiment, the top ring 61 has a smaller diameter than the bottom ring 62. Alternatively, the top ring 61 has a larger or same diameter than the bottom ring 62. In an embodiment, the seal 31 has a top surface 63 at the top ring 61 and a bottom surface 64 under the bottom ring 62.

The seal 31 has an opening 20 (FIG. 4) that passes through the body 60 from the top surface 63 through the bottom surface 64 in which the opening 20 serves to receive the stanchion 101 therethrough (as shown in phantom lines in FIG. 3). As will be described, when coupled to the stanchion 101, the seal 31 is configured to create a substantially hermetic pocket 11 that is to be filled with a lubricant. Various lubricants can be injected, like grease or liquid lubricants like oil. However, lower viscosity lubricants like 5 weight suspension oil, whether it be natural or synthetic, will have a lower friction coefficient than higher viscosity materials like grease and thus will have improved performance. The seal's 31 interior creates a substantially hermetic seal that maintains the fluid between the seal 31 and the stanchion 101. In addition, the seal 31 includes one or more injection ports 10 coupled to or integrated with the body 60, wherein fluid lubricant is injectable into the body 60 via an outer port opening 67.

Figure 4:
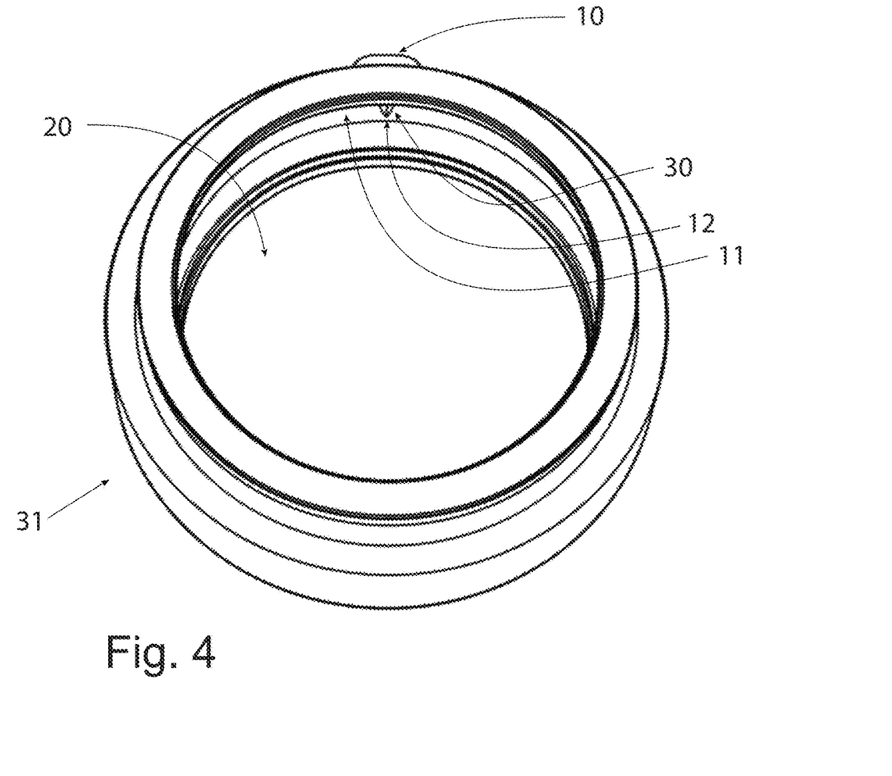
FIG. 4 Shows an elevated view of the seal with the injection port at the back, so it shows the inside of the seal where the fluid is injected into in accordance with an aspect of the present disclosure.

FIG. 4 illustrates an elevated view of the seal with the injection port at the back, so it shows the inside of the seal where the fluid is injected into. As shown in FIG. 4, the injection port 10 can be configured to have one or more inside injection port 12 which may include one or more flaps 30 which allow fluid to be pushed into the seal's interior but also prevents fluid from exiting back out the opening 67.

Figure 9:
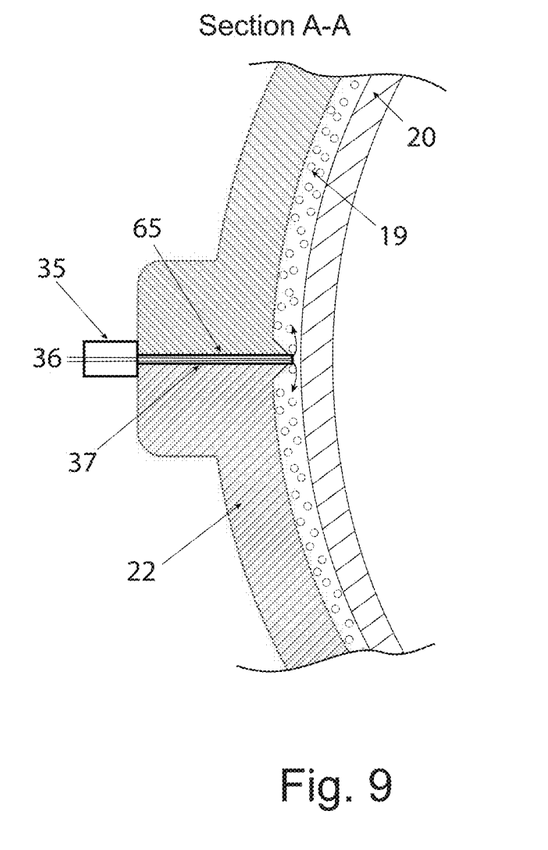
FIG. 9 Shows a detail of lubrication being injected into the seal/Stanchion interface from "Cutting Plane A" in FIG. 7 in accordance with an aspect of the present disclosure.

An alternate means of creating an injection port through the sides is contemplated. A channel, or channels, may be molded into the seal, whereby a plug may be used to fill the port (as shown in FIG. 9). The plug could be configured to thread in or snap in. In an aspect, the plug could be solid, or the plug may have a self-sealing injection port within the plug itself. It is contemplated that cutting the channel into the molded part as described is likely the preferred embodiment for ease of use, prevention of loss, reduced areas for leakage and reduced number of parts.

Figure 5:
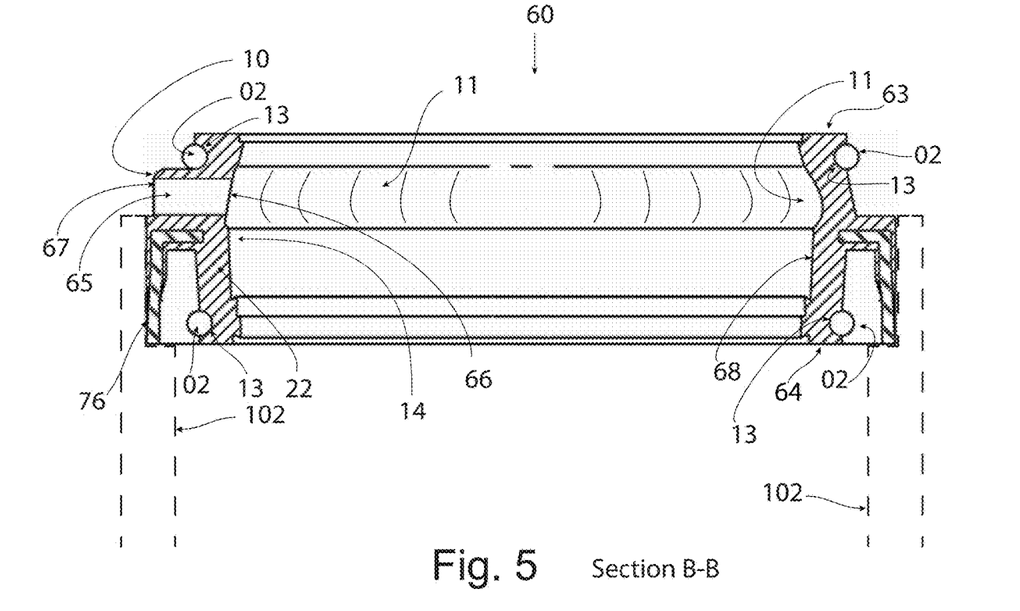
FIG. 5 Shows a half section of the seal along section B-B in accordance with an embodiment of the present disclosure.
Figure 6:
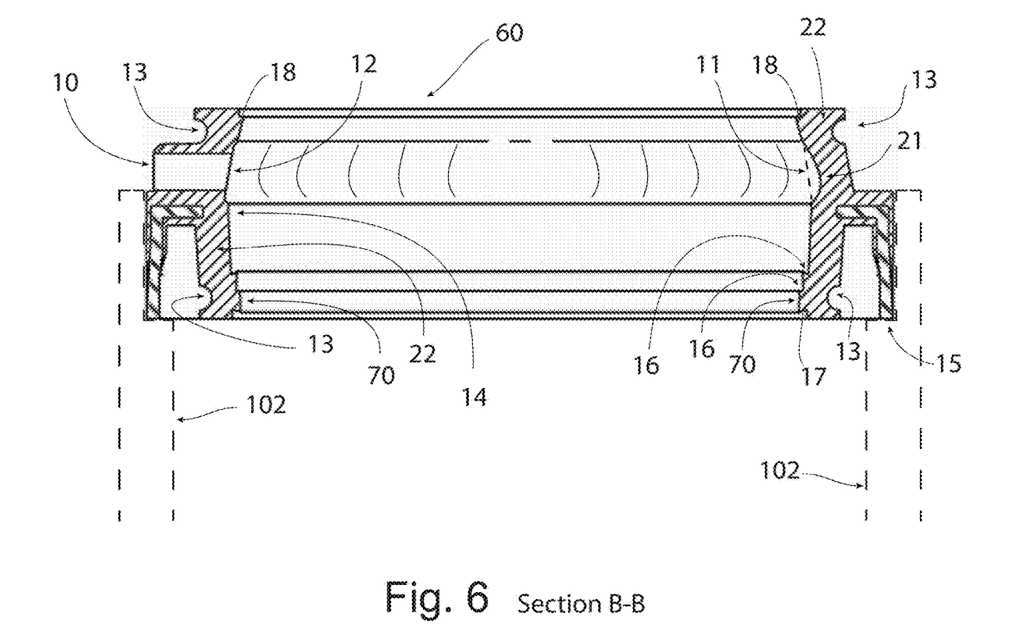
FIG. 6 Shows a half section of the seal along section B-B in accordance with an embodiment of the present disclosure.
Figure 21:
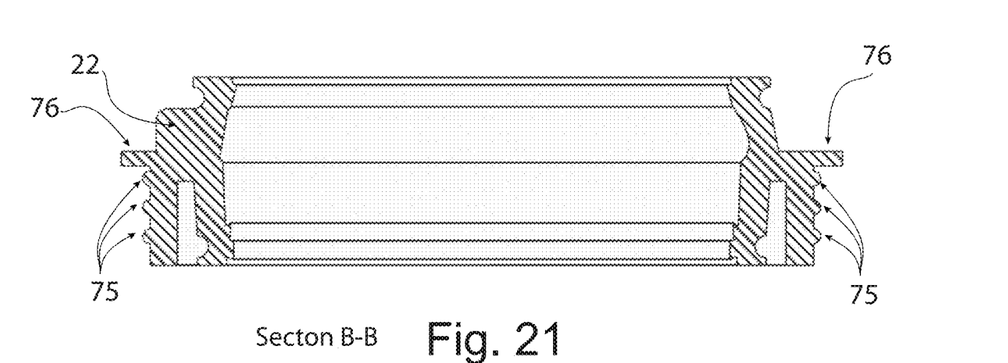
FIG. 21 Shows an alternate version, where the seal is made from flexible material without a metal or rigid insert, in accordance with an aspect of the present disclosure.

FIGS. 5 and 6 show a half section of the seal along section B-B in accordance with an embodiment of the present disclosure. As shown in FIGS. 5 and 6, an interior surface of the body 60 includes a primary guide surface 14 which is the portion of the flexible seal material 22 that is connected to the outer body. This guide surface can be supported by metal (or other rigid material) insert 15 that guides the stanchion 101 through the opening 20 and prevents unwanted movement or slop between the fork lower 102 and stanchion 101. The body and seal can also be made entirely of flexible material 22 without a rigid insert, as shown in FIG. 21. The body 60 includes spring recesses 13 in the top ring 60 and/or the bottom ring 62, whereby the recesses 13 each are configured to receive a spring 02 or other compression device like an O-ring to maintain a force between the seal 31 and the stanchion 102. In an aspect, spring like tension mechanisms may be integrated in the body 60 and not be a separate component. The flexible seal material 22 is rigid enough to ensure a tight, substantially or completely hermetic seal between the stanchion 101 and the lower forks 102. The material 22 in the upper and lower portions of the seal 31 may flex, but the primary guide surface 14 (FIG. 6) is designed to keep the stanchion 101 in alignment such that the rider does not experience a loose feeling between the stanchion 101 and the lower 102. The use of a rigid insert 15 (FIG. 6) also provides a firm interference fit 76 into the fork lowers 102 to hold the seal 31 in place for use. In the case of a seal without a rigid insert FIG. 21, circular ribs 75 can be used to aid in the interference fit 76 between the seal into the fork lowers.

As shown in FIGS. 5 and 6, the body 60 can include one or more upper wipers 18 at the top surface 63 that face outward away from the oil reservoir 11, along with lower inward facing wipers 16, and downward facing wiper 17, all shown as notches in the interior side of the body. The wipers 16, 17, 18 are concentric grooves cut into all or a portion of the interior surface 68 of the seal 31. The upper outward facing wiper 18 prevents dirt, water, dust or other contaminants from entering the seal from above. The upward facing wipers 16 help keep the lubrication within the seal reservoir 11 from leaking downward into the fork lower 102, while the downward facing wiper 17 is intended to keep the lubricating oils inside of the fork lowers from migrating upward, out of the lowers. The wipers along with the interior as shown in FIG. 7, the seal 31 forms one or more pockets 21 between the interior surface of the seal, defined by the wipers 16, 17 and 18 and the outer surface of the stanchion 102.

In an embodiment, the seal is injected with lubrication via the injection port 10, whereby extralubrication will purge out of the top of the seal 31 via the upward facing wiper 16, thereby letting the user know that the seal 31 is full. To prevent filling the fork lower 102 with lubricant when the user fills the seal, the seal 31 is designed such that the contact point(s) between the seal and stanchion 70 (FIG. 6), 16 below the reservoir 11 has tighter fit around the stanchion 101 compared to that of the contact points between the seal and stanchion above the reservoir 11. This can be accomplished by using appropriately loaded removable springs 02 at the top and bottom recesses 13, respectively. This allows the excess fluid to come out of the top of the seal 31 toward the upper stanchion 101, via wiper 18, and not out of the bottom toward the lower 102. An added benefit is that as the lubrication is purged out of the top of the seal 31, dirt and debris are expelled from the seal 31, thereby extending the service life of the seal.

There are a number of ways to achieve the desired effect of excess lubrication purging out of the top of the seal instead of the bottom. In an aspect, the lower ring 64 can have a thicker wall than the top ring 63, so the lower ring 64 is stronger and able to provide a greater seal with the stanchion 101. Alternatively, the lower ring 64 can have a smaller diameter than the top ring 63 which creates a tighter fit. It is also contemplated that the lower ring 64 could have a spring 02 at the lower location 13 which is configured to provide a tighter seal than the top spring. Additionally, the upper spring 02 could be removed, to create less pressure than the lower portion of the seal. Thus, it is desired that when lubrication is injected and filled, the excess comes out of the top, rather than the bottom which would fill the fork lowers and change the air volume within them. As shown in FIG. 3, the body 31 includes one or more injector ports 10 where lubrication is injected into the pocket 21 to provide active lubrication while the seal is in service. FIG. 5 shows a cross section view of the body 60 along line B-B. As shown in FIG. 5, the injection port has a port channel 65 in communication with an inner port opening 66 and an outer port opening 67. The outer port opening 67 forms a portion of the reservoir 11 and allows the lubricant to run most or all of the way around the top ring 61 to provide required lubrication between the seal 31 and the stanchion. In an embodiment, the lubrication reservoir 11 and pocket 21 is configured above the primary guide surface 14 as shown in FIG. 6. Alternatively or additionally, the reservoir and pocket 21 are below the primary guide surface 14.

Figure 7:
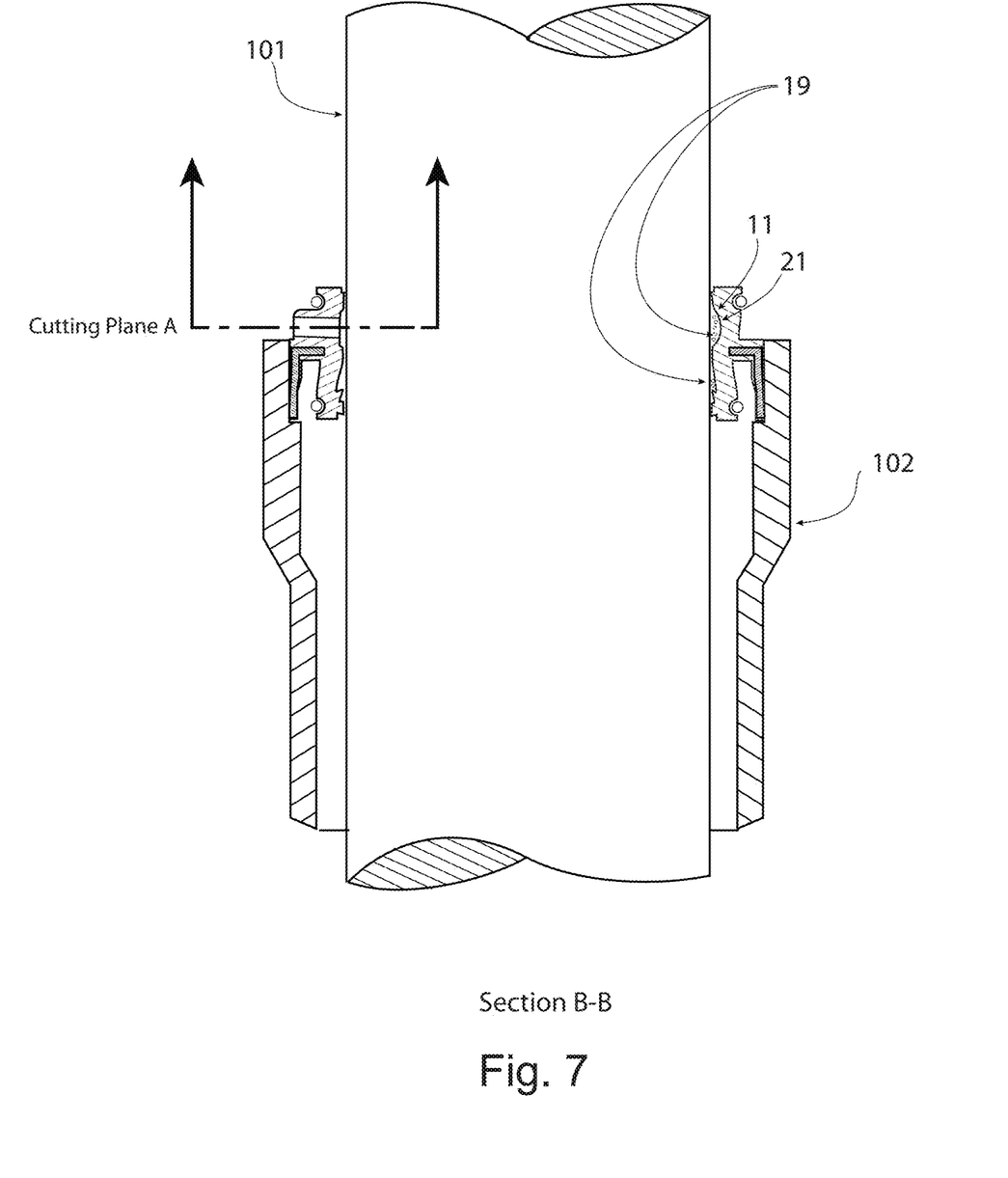
FIG. 7 Shows a half section of the seal and fork lowers, wherein the seal is shown pressed against the fork stanchion in accordance with an aspect of the present disclosure.
Figure 8:
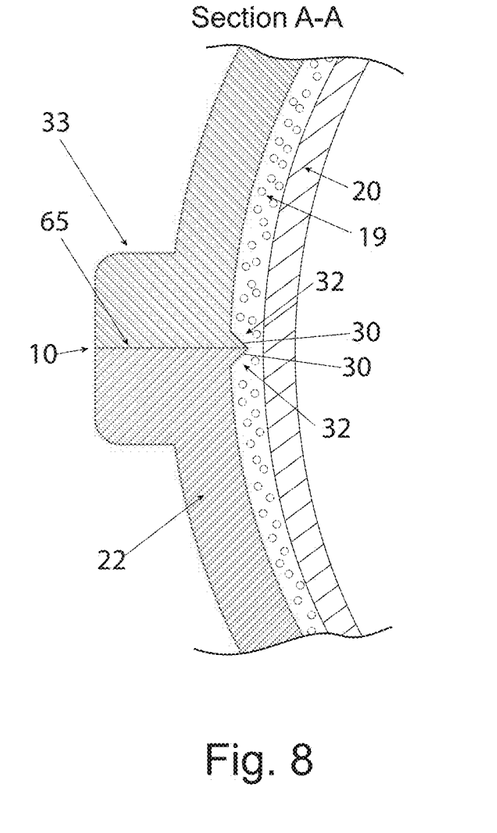
FIG. 8 Shows a detail of the injection port along section A-A from FIG. 7 in accordance with an embodiment of the present disclosure.

FIG. 7 illustrates a half section of the seal and fork lowers, wherein the seal is shown pressed against the fork stanchion in accordance with an aspect of the present disclosure. As shown in FIG. 7, the seal 31 is shown receiving and being coupled to the stanchion 101. Additionally, fluid 19 is shown within the pocket 21 near the top and bottom sections of the seal body. FIGS. 8 and 9 illustrate a detail of "Section A" from FIG. 7 that shows lubrication 19 contained in the pocket 21. FIG. 8 also shows the inside of the injection port 12 and the backflow prevention flaps designed into the seal. As described, the flexible seal is molded, and then the injection port channel 65 is cut into the injection port 10, creating a passage from the outside of the seal to the inside of the seal/stanchion interface in the pocket 21. The cut for the injection port can be linear as if cut with a blade, or circular as if punctured with a needle type instrument. Before it is cut, the inside facing surfaces of the exit area of the injection port channel 65 resembles a triangle which can be linear, or conical in nature if the port is cut with a circular tool. The cut for the injection port channel 67 bisects the triangle, creating two or more flaps 30 that prevent lubrication from leaking back out toward the outer port opening 67. Internal pressure 32 from the lubricant will push the flaps 30 closed, holding the injection channel 65 passage closed. This causes the seal to resist leaking lubricant back out of the injection port.

It should also be noted that a passage 77 in the location of the injection port could be molded into the seal (see FIG. 20), then filled with a correspondingly designed plug to close the passage. The plug may have an injection passage that travels through it in an aspect. In another aspect, the plug could be removed and lubricant may be injected through the passage before replacing the plug. Configuring a cut into the passage of the injection port through the seal that's originally molded as a solid has advantages of fewer parts and eliminating the possibility of losing the plug.

Figure 10:
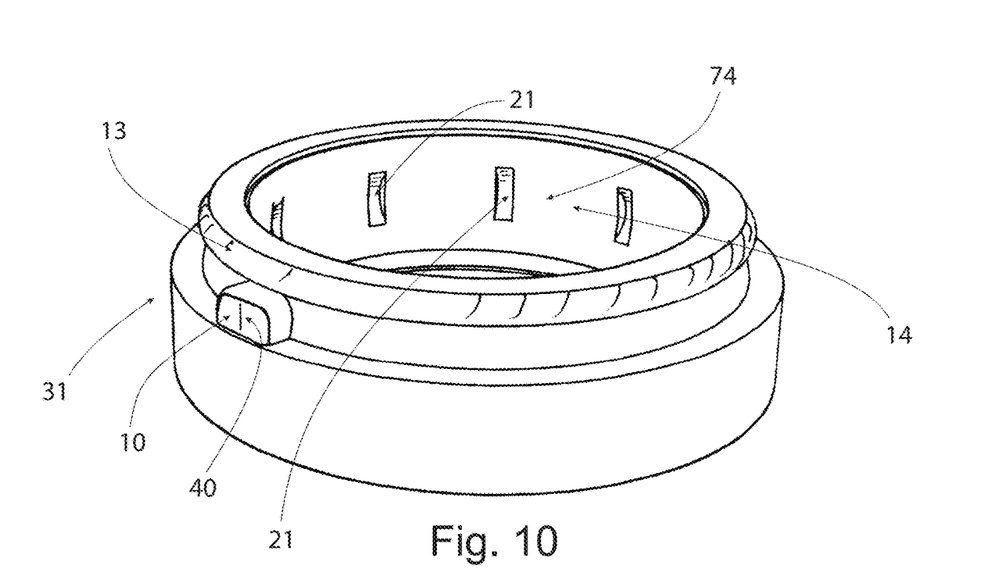
FIG. 10 Shows another version of the seal, with lubrication pockets where the primary guide surface is in accordance with an aspect of the present disclosure.

FIG. 10 Shows an embodiment of the seal, with lubrication pockets where the primary guide surface is in accordance with an aspect of the present disclosure. While there are advantages to having the lubrication reservoir above the primary guide surface, such as increased lubrication volume, lubrication reservoir pockets 40 are contemplated to be placed intermittently around the seal in the area of the primary guide surface 14. FIG. 10 illustrates an embodiment in which the interior surface of the seal 31 includes an inner wall 74 which has reservoir pockets 21 formed into it to hold the lubricant, whereby the inner wall 74 is configured to be in contact with the stanchion 101 when coupled together. The inner wall 74 includes slits 40 that are in communication with the pockets 21 such that fluid lubricant is held within the pocket 21 but exits toward the stanchion 101 via the slits 40. This embodiment allows the lubricant to be kept in the pocket 21 directly where the guide surface is, which can be the source of considerable friction.

Figure 11:
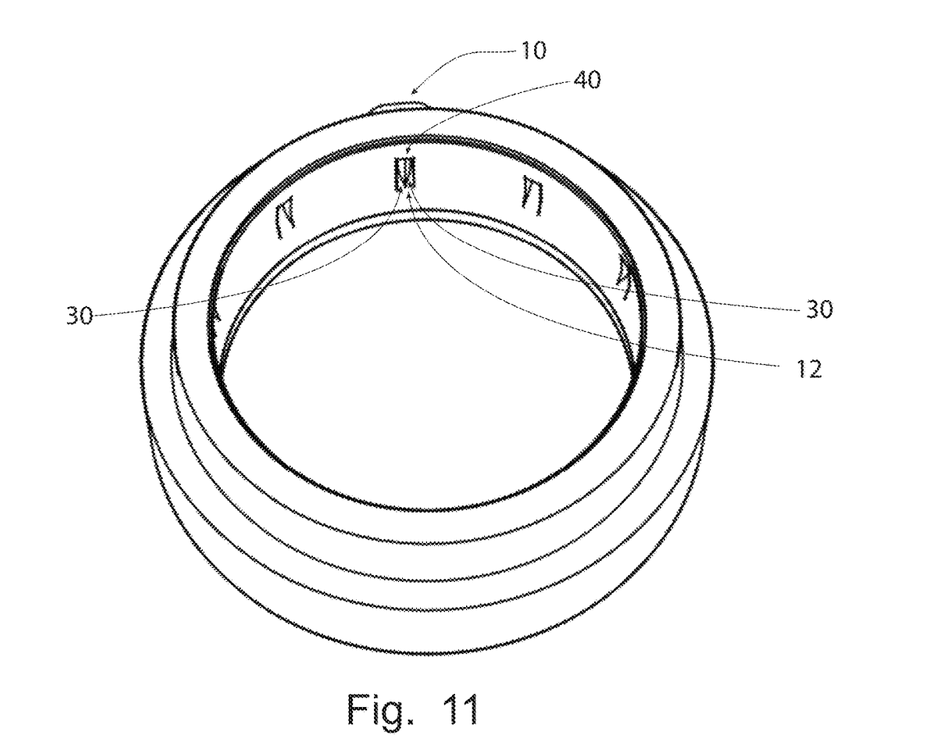
FIG. 11 Shows the seal version from FIG. 10, so the inside of the injection port is visible in accordance with an aspect of the present disclosure.

FIG. 11 Shows the seal version from FIG. 10, whereby the inside of the injection port is visible in accordance with an aspect of the present disclosure. As shown in FIG. 11, the inside portion 12 of the injection port 10, with the anti-leak flaps 30 reside within one of the pockets 40 in an aspect. It should be noted that although several slits 40 are shown, any number of slits 40, including none, are contemplated for use with the seal.

Figure 12:
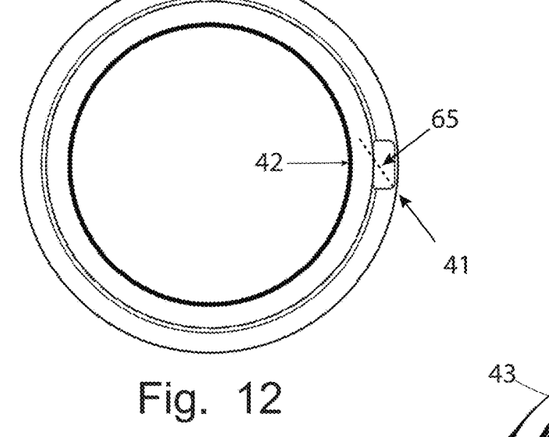
FIG. 12 Shows an alternate method of injecting lubrication at an angle in accordance with an aspect of the present disclosure.
Figure 13:
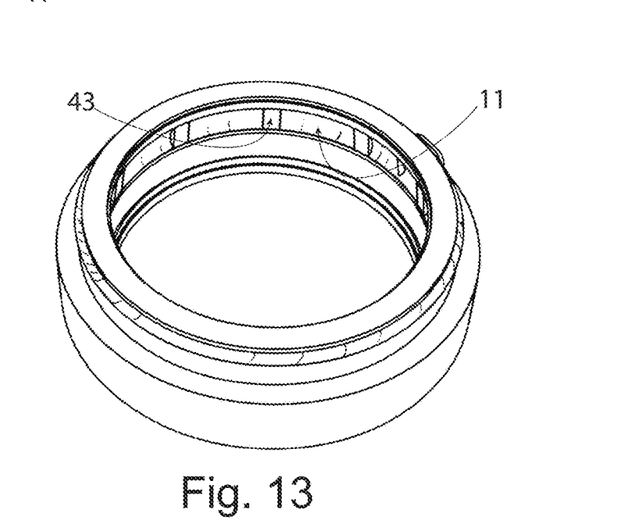
FIG. 13 Shows the seal reservoir with pockets to hold the lubrication above the guide surface in accordance with an aspect of the present disclosure.
Figure 14:
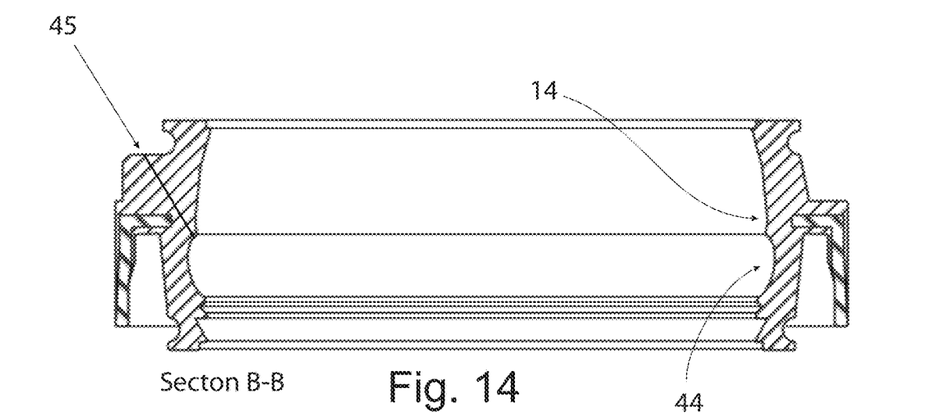
FIG. 14 Shows the seal with a reservoir below the primary guide surface in accordance with an aspect of the present disclosure.

FIG. 12 shows an alternate embodiment in which the injector channel 65 is configured to be at an angle 41 other than perpendicular to Axis A 42. The alternate injector channel 65 could create the inner pressure and could press a single flap closed in a similar way the flaps 30 work. FIG. 13 Shows the seal reservoir with pockets to hold the lubrication above the guide surface in accordance with an aspect of the present disclosure. FIG. 14 shows an alternate embodiment with the lubrication reservoir 44 located below the primary guide surface. This location of the reservoir could also be segmented into pockets 45.

Figure 15:
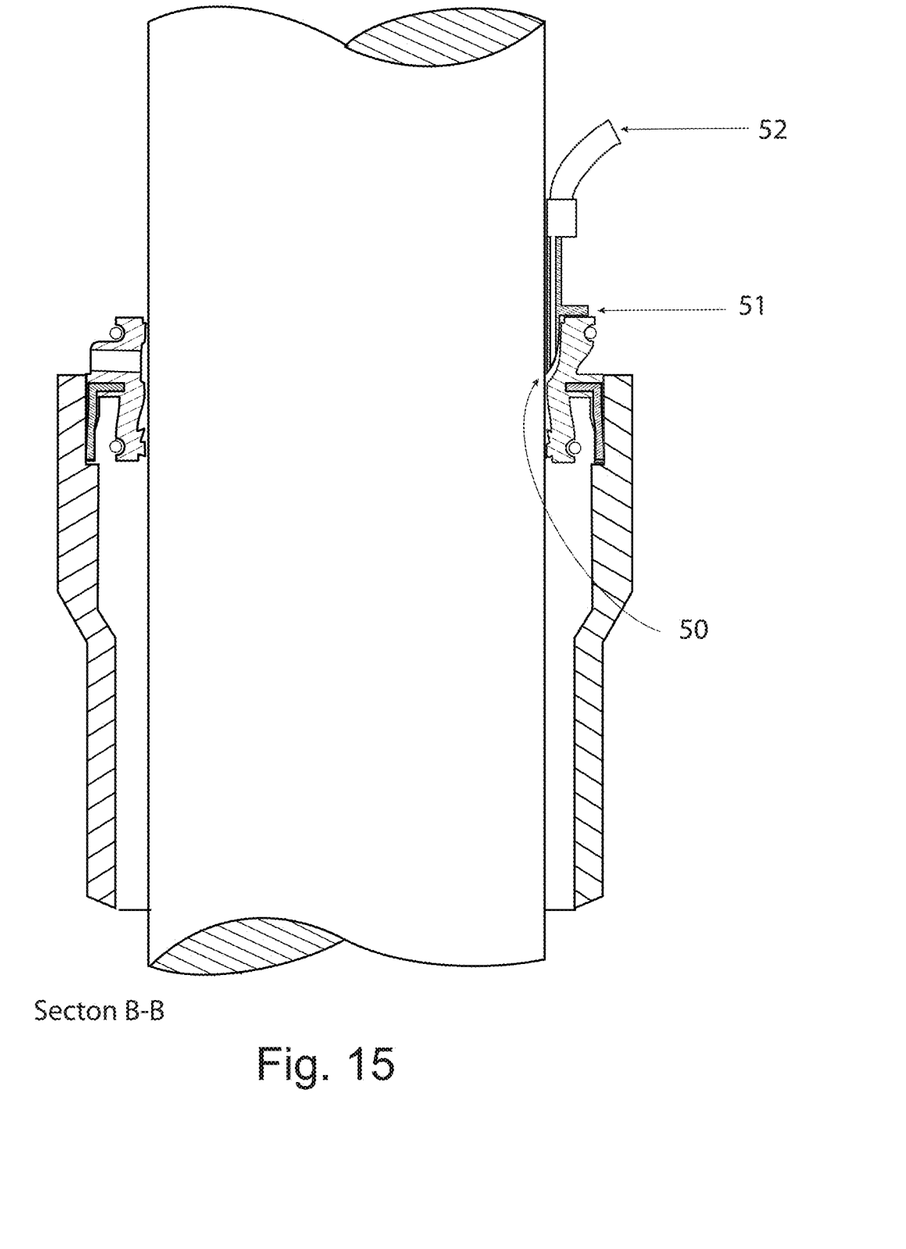
FIG. 15 Shows a cutaway view of an alternate filling method in accordance with an aspect of the present disclosure.

FIG. 15 Shows an injecting mechanism for filling the seal with lubrication by sliding a filler in from the top. A ramped surface 50 helps lift the seal away from the stanchion so lubrication can be injected into the seal. A physical stop 51, or a visual marking shows the depth the filler should be inserted. Lubrication can be pushed into the slide-in filler through a tube 52 or other configured device.

Figure 16:
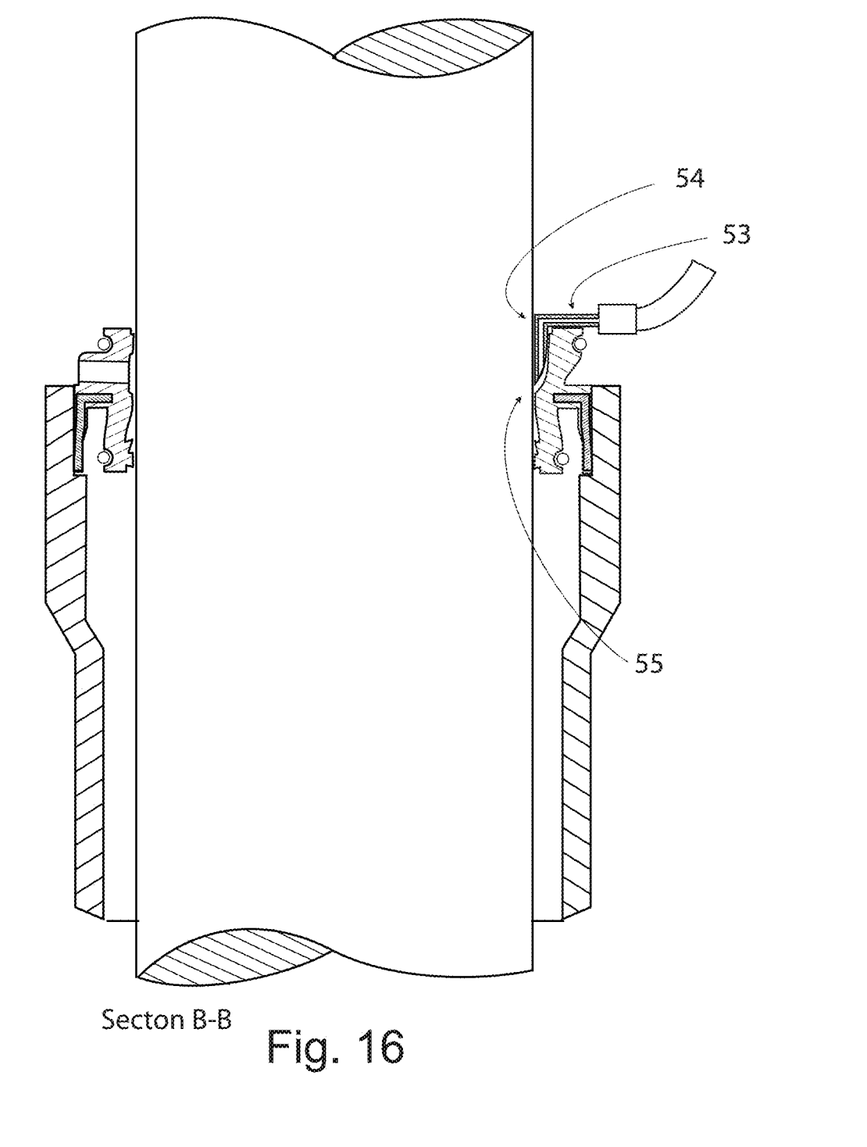
FIG. 16 Shows a cutaway view of another alternate filling method in accordance with an aspect of the present disclosure.

FIG. 16 shows a slide in method to inject lubrication where an injection tube 53 has a bend in it 54, creating a natural stop that positions the outflow of lubrication at a good depth 55 to deposit lubrication within the seal 31

Figure 17:
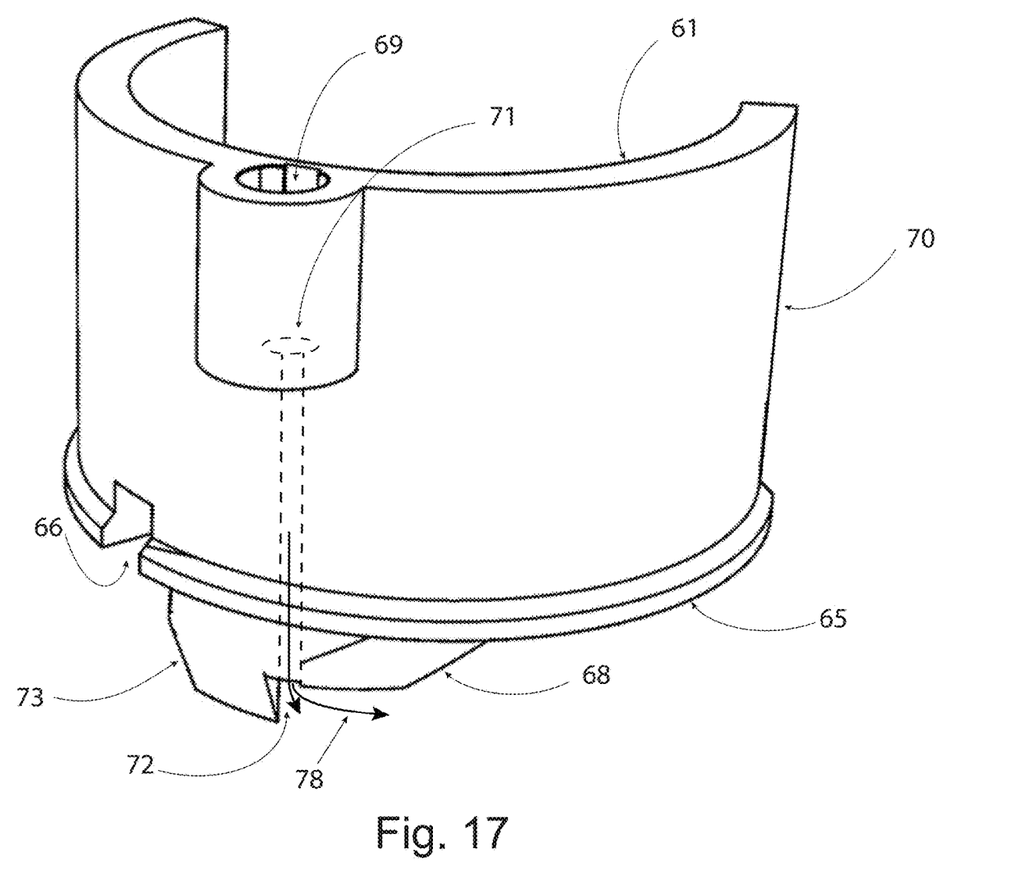
FIG. 17 Shows a clip on the filling system in accordance with an aspect of the present disclosure.

FIG. 17 shows a top loading filler 70 configured for use with the seal in accordance with an aspect of the present disclosure. The filler 70 is configured to clip onto the stanchion with its C shaped design 61. Clipping the guide onto the stanchion helps to guide the filler 70 in the correct position to lift the seal away from the stanchion. The ramped surface 73 lifts the seal away from the stanchion, so lubrication can be injected through the channel 71. exiting the filler at 72 into the seal reservoir. A stop at the bottom of the filler 65 positions the filler at the optimal depth to fill the seal. An injection device can be attached to the filler via tube or other means 66 to push the lubrication into the filler, through the channel 71 exiting the filler at 72 into the seal reservoir 11.

The ramped surface 73 that lifts the seal, also acts as a barrier to prevent the lubrication from filling the seal in that direction. This design promotes the lubrication to fill the seal in a single, uniform direction around the circumference of the stanchion. The lubrication reaches the ramp 73 again on the other side, which acts as a vent to release the excess lubrication through the vent 66 so the user can see that the seal has been filled. The edge of the filler in the direction of the fluid flow 78 tapers back down to the stanchion to prevent leakage before filling the circumference of the seal. A mechanism to inject lubrication into the clip-on filler, such as a tube, can be inserted into the receptacle shown at the area shown at 69, which is in communication with channel 71.

Figure 18:
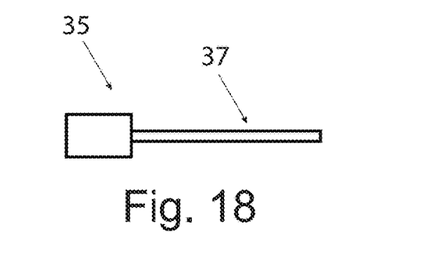
FIG. 18 Shows a needle like injector for use with the seal of the present disclosure in accordance with an aspect of the present disclosure.

FIG. 18 shows a needle like injector used to inject lubrication through the injection port into the seal. The injector can be configured to attach to a syringe or other device. The injector has a slender portion 37 of the proper length to insert into the seal port the proper depth to fill it, without inserting too far, and scratching the Stanchion.

Figure 19:
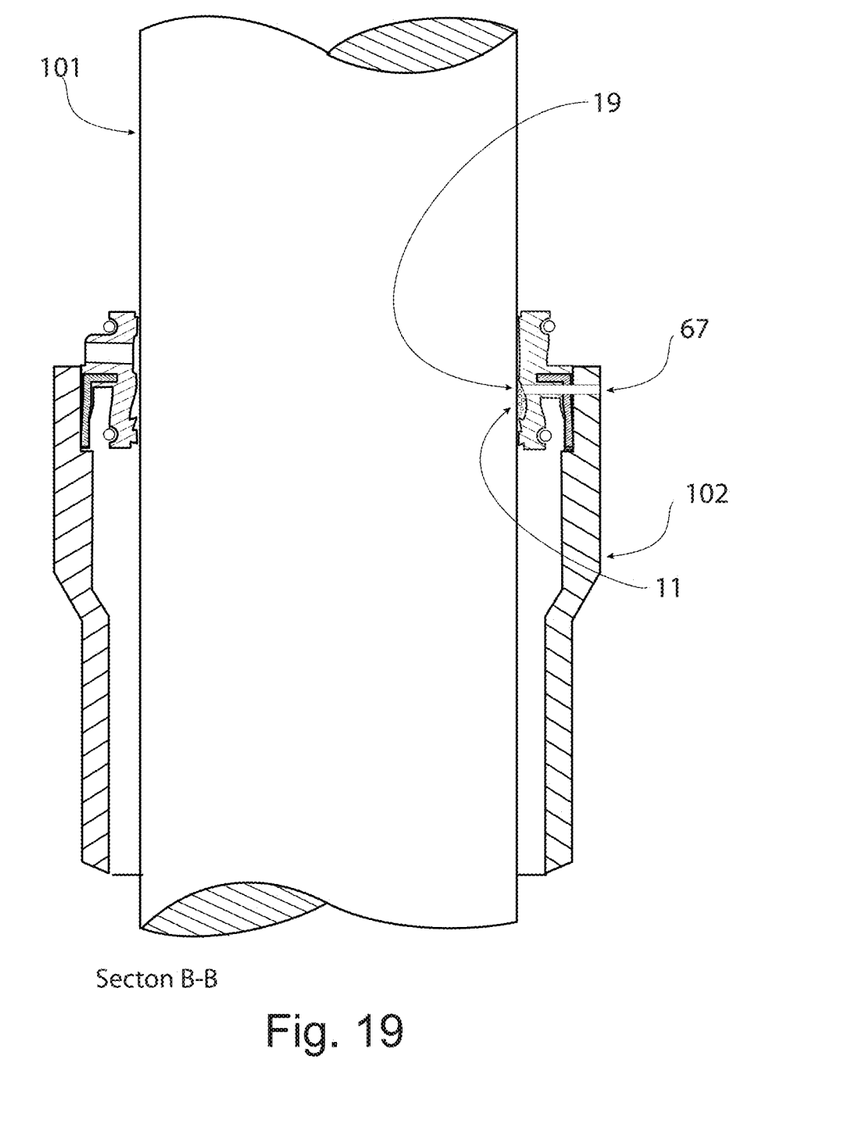
FIG. 19 Shows an alternate version, where the filling port is below the top of the fork lowers in accordance with an aspect of the present disclosure.

FIG. 19 Shows an alternate design where the injection channel 67, is below the top of the fork lowers 102. The injection port could be accessed through the side of the fork lowers, or a notch in the side of the fork lowers.

Figure 20:
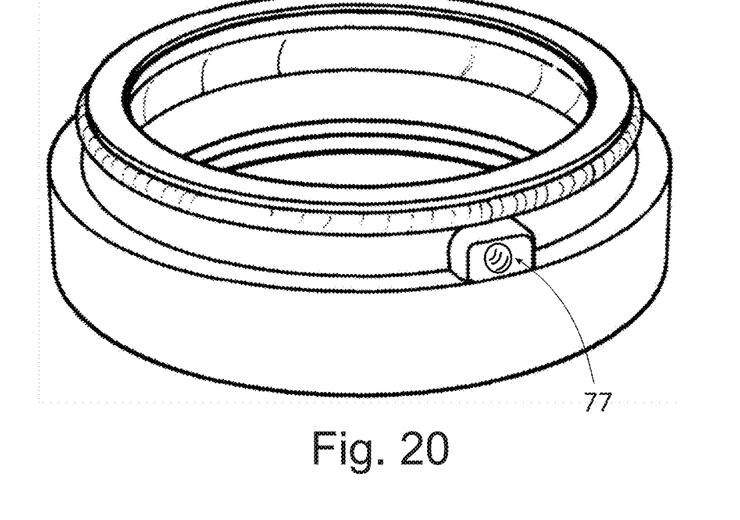
FIG. 20 Shows an alternate version, where an injection port is molded into the seal in accordance with an aspect of the present disclosure.

FIG. 20 Shows an alternate design where the injection channel 77 is molded into place, rather than cut into the seal after molding.

FIG. 21 Shows an alternate design where the seal is constructed from flexible material, without the use of a metal insert. It also shows that the seal can be made with, or without flanges 76. It also shows that the seal could have a plurality of circular ribs molded into the outside to aid with the interference fit into the fork lowers.

Operation

To make use of this lubricating seal for reciprocal members, first, the seal is installed into the fork lowers during a service or assembly. Then the forks are fully assembled and ready to be mounted to the bike. Once the fork is assembled with the seals in place, lubrication is injected through the injection port to fill the pocket 21 with liquid lubrication, ideally, until lubrication is purged from the top of the seal, indicating that it is full. Now the seal will be ready for use and will continuously lubricate the seal and stanchions for reduced friction, longer service life and a ride that is less jarring since the friction is reduced. The injection port provides an easy way for the end user to refill the seals with lubrication very quickly to further extend the life of the seal and delay the need for more expensive, more complex maintenance, even if the user is not very mechanically inclined.

The seal can be configured to allow lubricants to be injected in different ways. In the refill method, injection through the port would be done by using something similar to a needle valve that is used to fill basketballs. To perform a refill, the site of the injection port should be wiped clean, then the needle valve, attached to a syringe full of lubrication, or other means, would be inserted into the port 10. By pressing the plunger on the syringe, lubrication is forced through the needle valve and into the seal. When the seal is full, lubrication should come out the top of the seal, so the fork lowers do not get filled with lubrication. The excess lubrication and debris from the top of the seal are wiped off and the fork is ready for use.

In another refill method that is disclosed, a refill system that allows for injecting lubrication into the seal from the top of the seal, as shown in FIGS. 15-17. The refilling system that fills from the top has something of a wedge that lifts the seal away from the stanchion, when inserted to the proper depth, lubrication is forced through a channel in the wedge and into the seal. The wedge tip could have a line or a mark on it that shows how far it should be inserted before injecting the lubricant. An embodiment of the seal would include a physical stop that prevents the wedge from being inserted too far into the seal. A preferred design is a clip-on system that clips onto the stanchion by grabbing around it, and also has a stop to prevent over insertion. To use this method, the filler is clipped or pressed against the stanchion, then when slid down the stanchion, the wedge is driven between the seal and the stanchion to lift the seal away, then the stop positions the wedge to the proper depth. Once it's in place, lubrication is injected from a syringe through the channel in the wedge and into the seal. When it's full, lubrication comes out the top and then the filler is removed and excess lubrication is removed along with any dirt or debris.

I claim:

1. A seal for use between a first and second telescopically configured bicycle member, comprising:
   a substantially cylindrical body having a first ring portion and a second ring portion, the first ring portion having a diameter that is different than a diameter of the second ring portion, wherein the first ring portion is adapted to be coupled to a first telescopic bicycle member and the second ring portion is adapted to be coupled to a second telescopic bicycle member, the body having an opening defined therethrough from a top surface of the first ring portion to an opposing bottom surface of the second ring portion, the opening configured to receive the first telescopic bicycle member therethrough, and the second ring portion includes an L-shaped rigid insert; and an injector port located in the first ring portion of the body, the injector port having a first port opening and a second port opening and a port channel in communication with the first and second port openings, the second port opening in communication with a pocket located along a portion of the opening of the body, the injector port configured to receive lubricant in a first flow direction from the first port opening to the second port opening, wherein the pocket is configured to hold the lubricant in contact with the first telescopic bicycle member, and wherein the opening of the body is at least partially located below the pocket wherein the body includes one or more wipers located in the second ring portion, wherein the one or more wipers are configured to prevent the lubricant from flowing down from the pocket out of the bottom surface, and wherein the injector port is parallel to the top surface.

2. The seal of claim 1, wherein the first telescopic bicycle member is a bike stanchion and the second telescopic bicycle member is a lower fork.

3. The seal of claim 1, wherein the pocket further comprises an open reservoir for communication with the first telescopic bicycle member.

4. The seal of claim 1, wherein the pocket further comprises an inner wall configured to be between the open reservoir and the first telescopic member.

5. The seal of claim 4, wherein the inner wall further comprises one or more flaps in communication with the pocket.

6. The seal of claim 1, wherein the body further comprises one or more spring recesses configured to receive loaded springs.

7. The seal of claim 1, wherein the body further comprises a wiper located in the first ring portion.

8. The seal of claim 1, wherein the injector port further comprises one or more moveable flaps which allow the lubricant to flow in the first direction and prevent the lubricant from flowing in an opposite direction out the first port opening.

9. The seal of claim 8, wherein the one or more moveable flaps are in communication with the pocket.

10. The seal of claim 8, wherein the one or more moveable flaps are positioned to be facing the pocket.

11. The seal of claim 1, wherein the injector port is configured to receive at least a portion of a filling member therein, wherein the filling member deposits the lubricant into the pocket.

12. A seal for use between a first and second telescopically configured bicycle member, comprising:

a substantially cylindrical body having a first ring portion and a second ring portion, wherein the first ring portion is adapted to be coupled to a first telescopic bicycle member and the second ring portion is adapted to be coupled to a second telescopic bicycle member, the body having an opening defined therethrough from a top surface of the first ring portion to an opposing bottom surface of the second ring portion, the opening configured to receive the first telescopic bicycle member therethrough, and the second ring portion includes an L-shaped rigid insert; and an injector port located in the first ring portion of the body, the injector port having a first port opening and a second port opening and a port channel in communication with the first and second port openings, the second port opening in communication with a pocket located along a portion of the opening of the body configured to hold a fluid therein, the injector port configured to receive the fluid in a first flow direction from the first port opening to the second port opening, wherein the pockets is configured to hold the fluid in contact with the first telescopic bicycle member, and the opening located above and below the pocket, wherein the body includes one or more wipers located in the second ring portion, wherein the one or more wipers are configured to prevent the lubricant from flowing down from the pocket out of the bottom surface, and wherein the injector port is parallel to the top surface.

* * * * *